3,077,477
LACTAMS AND METHODS OF PREPARATION
Newman M. Bortnick, Oreland, Pa., assignor to Rohm & Haas Company, Philadelphia, Pa., a corporation of Delaware
No Drawing. Filed May 12, 1960, Ser. No. 28,529
16 Claims. (Cl. 260—325)

This invention relates to lactams and methods of their preparation. More specifically, the invention deals with addition products of a ketone with a ketonitrile and methods for preparing them.

The addition products of the invention are lactams which may be represented by the general formula

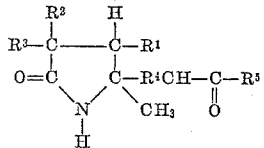

(I)

A special aspect of the invention covers dilactams that may be represented by the general formula

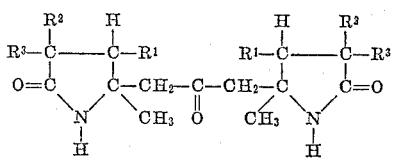

(II)

In Formulas I and II, the substituents R are defined further below.

Another important aspect of the invention provides a preparation of these lactams by a method which comprises contacting a ketonitrile of the formula

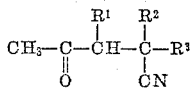

(III)

with a ketone of formula

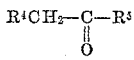

(IV)

in the presence of a strong alkaline catalyst.

In Formulas I, II, and III, the R substituents have the following definition:

$R^1$, $R^2$ and $R^3$ are a hydrogen atom, an alkyl group containing 1 to 6 carbon atoms, or a hydrocarbon group containing from 5 to 10 carbon atoms and including cycloalkyl, aralkyl, aryl, and alkaryl groups, the substituents which $R^1$, $R^2$ and $R^3$ represent may be identical or not; also, $R^1$ and $R^2$, taken together with the carbon atoms to which they are bonded, form a carbocyclic ring containing 5 to 6 carbon atoms, which in turn may have alkyl substituents containing each a total of no more than four carbon atoms; $R^2$ and $R^3$ taken together with the carbon atom to which they are bonded, form a carbocyclic ring containing 5 to 6 carbon atoms, which in turn may have alkyl substituents containing each a total of no more than four carbon atoms. Preferably, the total number of carbon atoms in these ketonitriles does not exceed twenty-four carbon atoms.

Typical of these ketonitriles are the following: levulinonitrole, 3-methyl-4-oxopentanenitrile, 2,2-dimethyl-4-oxopentanenitrile, 2 - methyl - 2 - ethyl - 4 - oxopentanenitrile, 2 - methyl - 2 - (2,2,4,4 - tetramethylpentyl) - 4 - oxopentanenitrile, 2 - methyl - 2 - neopentyl - 4 - oxopentanenitrile, 2 - (1 - cyanocyclohexyl) - cyclohexanone, 2,2-diphenyl-4-oxopentanenitrile, 5-methyl-2-(1 - methyl - 1 - cyanoethyl) - cyclohexanone, 2,2 - dicyclohexyl - 4 - oxopentanenitrile, 1,3,3 - trimethyl - 5 - oxocyclohexanecarbonitrile, 2 - acetyl - 1 - methylcyclopentanecarbonitrile, 2 - acetylcyclohexanecarbonitrile, 1 - butyl - 2 - methyl - 3 - oxocyclopentanecarbonitrile, 1 - (2 - oxocyclopentyl) - cyclohexanecarbonitrile, 1 - (2-oxopropyl) - cyclopentanecarbonitrile, 1 - (1 - pentyl - 2 - oxopropyl) - pentanecarbonitrile, 1 - octyl - 2 - methyl-3 - oxocyclohexanecarbonitrile, 2 - acetyl - 1 - methylcyopentanecarbonitrile, 2 - butyl - 2 - naphthyl - 4 - oxopentanenitrile, 3,3 - dimethyl - 2 - (2 - oxopropyl) - bicyclo[2.2.1]heptane - 2 - carbonitrile, 2 - benzoyl - 1-methylcyclopentanecarbonitrile, 2 - butyl - 2 - naphthyl-4-oxobutanenitrile and the like.

In accordance with the invention, these ketonitriles are reacted with a ketone of formula

(IV)

In these ketones and in the products, the substituents $R^4$ and $R^5$ have the following definition:

(A) When $R^4$ and $R^5$ are considered individually—
(1) $R^4$ is a hydrogen atom;
(2) $R^5$ is (a) an aliphatic hydrocarbon group free of acetylenic unsaturation containing from 1 to 12 carbon atoms and including: alkyl groups containing from 1 to 12 carbon atoms and alkenyl groups containing from 3 to 8 carbon atoms, such as methyl, isoamyl, hexyl, isooctyl, octyl, dodecyl, propenyl, 1-butenyl, 2-methylpropenyl, 1-hexenyl, 1- octenyl, 2-octylene, 2-hexylene, allyl, methallyl, and the like;
(b) An aromatic hydrocarbon group containing from 6 to 14 carbon atoms, such as phenyl, naphthyl, and anthryl which may be substituted with non-interfering substituents, such as alkyl containing 1 to 18 carbon atoms, hydroxyl, alkoxy containing 1 to 18 carbon atoms, halogen atoms having an atomic number from 9 to 35, and nitro substituents; and
(c) A —$CH_2R^6$ group wherein $R^6$ is a hydrogen atom, an aromatic group defined under (A) (2) (a), an aliphatic group defined under (A) (2) (b), and a lactam grouping of the formula

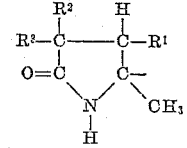

in which the R substituents are defined as described for Formula III;

(B) When $R^4$ and $R^5$ are taken together with the carbon atoms to which they are joined there is formed—
(1) A carbocyclic ring containing 5 to 6 carbon atoms, which in turn may have alkyl substituents containing each a total of no more than four carbon atoms, such as cyclohexyl, cyclopentyl, cycloheptyl, p-t-butylcyclohexyl, m-isopropylcyclohexyl; and
(2) A fused grouping of a group defined under (A) (2) (b) fused onto two adjacent carbon atoms of a group defined under (B) (1), especially a fused grouping in which the group defined under (A) (2) (b) is an unsubstituted aryl group containing 6 to 14 carbon atoms, such as α-hydrindone, α-tetralone, and methoxy-α-tetralone.

Examples of such ketones are the following: acetone, methyl ethyl ketone, methyl propyl ketone, methyl hexyl ketone, methyl isopropyl ketone, methyl isobutyl ketone, methyl t-butyl ketone, methyl dodecyl ketone, mesityl oxide, methyl allyl ketone, methyl methallyl ketone, acetophenone, civetone, exaltone, p-nitroacetophenone, m-chloroacetophenone, p-isopropyl-acetophenone, p-t-octylacetophenone, methyl naphthyl ketone, 2-acetylphenanthrene, 2-acetyl-1-naphthol, 1-acetonaphthone, 2-hydroxycyclohexanone, cyclopentanone, cyclohexanone, cycloheptanone, p-t-butylcyclohexanone, m-isopropylcyclohexanone, 3-methylcyclopentanone, α-hydrindone, β-hydrindone, α-tetralone, β-tetralone, 6-methoxy-α-tetralone, p-methoxyacetophenone, 4-butoxycarbonylcyclohexanone, 4-methoxycyclohexanone, 4-hydroxycyclohexanone, n-aminoacetophenone, p-dimethylaminoacetophenone, 2-trifluoromethylacetophenone, p-methoxyacetophenone, methyl levulinate, butyl levulinate, and ethyl β-methyllevulinate.

An embodiment of the invention that is equivalent to the general aspect described above covers the aspects in formula IV above, the group $R^5$ contains "$n$" additional substituents of the type.

wherein $n$ has a value ranging from 1 to 2. Such polyketones participate in the reaction with the above defined ketonitriles at from 1 to $n+1$ active sites on the molecule to form the corresponding lactam or polylactam. In this manner, acetonylacetone reacts with 4-oxo-2,2-dimethylpentanenitrile to give the lactam and the dilactam, a 1:1 and a 2:1 reaction product, respectively. Likewise, 1,3,5-triacetylbenzene reacts with 4-oxo-2,2-dimethylpentanenitrile to yield 1:1, 2:1, or 3:1 ketonitrile: triketone lactam products.

Typical of such polyketones are the following: 2,5-heptanedione, acetonylacetone, 4-acetylcyclohexane, 3-acetylcyclohexanone, 1,4-cyclohexanedione, m-diacetylbenzene, 1-methone, 1,3,5-triacetylbenzene, p-diacetylbenzene, and 1,4-diacetylcyclohexane.

The method of preparation of the lactams comprises reacting a ketonitrile of Formula III with a ketone of Formula IV in the presence of a strong alkaline catalyst. The exact proportion of cyanoketone that is reacted is not critical since the addition products are readily formed under the conditions prescribed, regardless of the specific amount of each cyanoketone used. To promote completeness of the reaction, stoichiometric amounts of ketone and ketonitrile are used. By increasing the proportions of ketone, the formation of lactam is favored at the expense of the formation of ketonitrile dimer by-product. Accordingly, an excess of ketone is generally used, a 4:1 ratio being a practical upper limit favoring lactam formation to a satisfactory extent.

In the situation of the invention in which in Formula IV, $R^5$ contains a lactam group, dilactams of the Formula II are obtained when at least two moles of ketonitrile of Formula III are used per mole of ketone of Formula IV. The formation of lactams and dilactams concurrently is favored by decreasing the proportion of ketonitrile until the respective 1:1 molar proportion is reached. The precise amount of ketone and ketonitrile employed is subject to considerable leeway since, in addition to the above consideration, formation of lactams and dilactams is also being influenced by the selection of the individual ketone and ketonitrile.

In accordance with the process of the invention, the reaction is exothermic and, accordingly, the temperature is not critical, except that for best yields, cooling may be applied. For the more sluggish cyanoketones some initial heating may be desirable to promote the start of the reaction unless it is desired to obtain this effect by adjustment of the type and/or amount of basic catalyst.

An overall temperature range of $-50°$ to $200°$ C. may be suggested for the reaction, a lower range as from $-50°$ to $50°$ C. being better suited for initiating the reaction of the more reactive cyanoketones, whereas generally the preferred temperature range extends from $0°$ to $150°$ C. Since atmospheric pressures are entirely satisfactory, there is no need for sub- or superatmospheric pressures. As the reaction proceeds and reaches towards completion, the heat abates until it is finally dissipated, and this may be taken as a convenient measure of the progress of the reaction.

Generally, it is advantageous to carry out the reaction in an inert volatile organic solvent, such as aliphatic and aromatic hydrocarbons, ethers, and esters, such as ethyl acetate, methyl propionate, and the like, benzene, toluene, xylene, dioxane, diethyl ether, dimethyl ether of ethylene glycol, and the like. Preferably enough solvent is present to insure optimum interaction between the cyanoketone and the basic catalyst. At the conclusion of the reaction, the solvent is readily removed such as by stripping, preferably at reduced pressures.

In acordance with the invention, there is employed a strong alkaline catalyst which promotes the formation of the addition products from the specified cyanoketones. For this purpose, there may be employed any strong base. Typical are the alkali metals and the alkaline earth metals, such as lithium, sodium, potassium, strontium, barium, and calcium; alkali metal hydroxides, such as sodium hydroxide, potassium hydroxide; their oxides such as lithium oxide, sodium oxide, and potassium oxide; alkali metal lower alkoxides such as lithium butoxide, sodium methoxide, sodium t-butoxide, and potassium ethoxide; alkali metal hydrides such as sodium hydride and potassium hydride; alkali metal amides such as sodium amide, lithium amide, potassium amide; alkali metal lower alkyls, alkenyls and alkynyls such as methyl lithium, ethyl sodium, butyl potassium, allyl sodium, and butenyl potassium; phenylalkyl alkali metals such as benzyl sodium, phenylisopropyl potassium, sodium phenylacetylide and alkali metal aromatic such as phenyl sodium, phenyl lithium and phenyl potassium, phenyl butyl sodium; "Alfin" catalysts, which are commercial mixtures of alkali metal alkenyls and alkali metal alkenoxides, such as allyl sodium with sodium allyoxide and buteny potassium with sodium butenyloxide, and quaternary ammonium bases such as trimethylbenzylammonium hydroxide and dimethyldibenzylammonium hydroxide and the corresponding alkoxides, such as trimethylbenzylammonium butoxide, chloline methoxide, and the like.

The proportion of the base which is used may range from the smallest catalytic amount which will promote reaction to an amount which causes its maximum practical speed with the individual cyanoketone selected. This proportion may vary from about 0.1 mole percent to about 30 mole percent of base, 0.5 to 10 mole percent generally giving an efficient rate of reaction, suitable adjustment of the amount of catalyst used being performed to best suit the individual cyanoketone and base selected.

Although the specific order of reaction of the reactants and the catalyst is not critical, a preferred method comprises adding basic catalyst in the ketone, in which it may dissolve or be suspended, and then adding the ketonitrile to that mixture. Alternatively, the ketonitrile with incorporated catalyst may be added to the nitrile. If desired, the catalyst may be added initially to both reactants. All of the desired amount of reactants may be mixed at one time, or addition of one reactant to the other may be incremental. To promote reaction, it is preferable to actively stir the reactants. As the exotherm subsides, the reaction is esesntially complete. It is usually advantageous to conduct the present method for about an hour or two after the heat of reaction is finally dissipated. This is to maximize yields. Otherwise, the reaction may be concluded as one skilled in the art finds desirable.

At the conclusion of the reaction, there may be added to the reaction mixture enough of a mineral acid to neutralize the catalyst. Typical acids include sulfuric acid, hydrochloric acid, nitric acid, perchloric acid, trifluoroacetic acid, trichloroacetic acid, phosphoric acid and the like are preferred. The product formed may be removed by any suitable method such as by filtration. Otherwise, the reaction system may be washed with water and the aqueous layer separated or decanted when the product is a solid. Any solvent employed may be stripped off, preferably under reduced pressure. Unused reactants, when present, may be washed out with water or stripped off under reduced pressure. If the product is a liquid, it may be distilled, if desired. Solid products may be recrystallized in a conventional manner from a suitable solvent such as hexane, heptane, benzene, toluene, ethylene dischoride, chloroform, or the like.

The lactams of the invention have a wide variety of valuable utilities. They are useful starting materials for chemical reactions. Moreover, the lactams of the invention are useful pesticides, particularly in herbicidal, insecticidal, and fungicidal applications.

The present compounds may be used as stomach poisons for combatting agricultural pests such as bean beetle and armyworms. When compounded and dispersed into 25% wettable powders, and dispersed and applied at the rate of 2 lbs./100 gals. of water per acre, 3,3,5-trimethyl-5-benzoylmethyl-2-pyrrolidinone kills over 70% of these insects. In fungicidal tests, complete kill of *Stemphylium sarcinaeforme* and of *Monilinia fructicola* is obtained in concentrations of 0.1% with 3,3,5-trimethyl-5-(2-oxo-4-methyl-pent-4-enyl)-2-pyrrolidinone. In herbicidal applications, the present compounds are useful in controlling aquatic weeds in concentrations of 10 p.p.m. In additional tests, Indian mallow is controlled by preemergence applications.

In agricultural applications, the present compounds, either singly or in mixtures, are applied as dusts, wettable powders, self-dispersible concentrates, in solution or suspension. Compositions suitable as dusts are prepared from the 2-pyrrolidinones of the invention dispersed in a solid carrier, such as talc or clays. The compounds may be used in an amount ranging from ½ to 25% or more, if it is desired. As wettable powders, the compounds of the invention are mixed with a suitable wetting agent, such as a water-soluble surface-active polyethoxyalkylphenoxypolyethoxyethanol and a suitable dispersing agent, such as a formaldehyde condensed naphthalene sulfonate. The wettable powder may then be suspended in an aqueous medium and applied as a spray. Also, the 2-pyrrolidinones may be formulated into self-emulsifible or self-dispersible concentrates or as aqueous sprays.

The following examples, in which all parts are by weight unless otherwise indicated and all temperatures are in ° C., are offered as illustrative of the method and the compounds of the invention and are not intended to be construed as a limitation thereof.

*Example 1*

Acetone, 174 parts, is placed in a stirred reactor and to it there is added sodium methoxide, 4.2 parts, with vigorous agitation. The mixture warms slightly and a solid precipitate is formed. 2,2-dimethyl-4-oxopentanenitrile, 187.5 parts, is added slowly with agitation. An exothermic reaction begins after about 1% of the ketonitrile has been added. The solid gradually dissolves and the temperature rises to the reflux point. The addition of the ketonitrile is completed while the reaction mixture is maintained under vigorous reflux owing to the evolution of heat in the course of the reaction. The reaction mixture is cooled to 50° C. and at which time it becomes turbid. It is then treated with concentrated sulfuric acid (3 parts by volume). The color of the reaction mixture changes from red to pale yellow. The mixture is stripped free of acetone and distills under reduced pressure. The product of the first cut, B.P. 148°–155° C. (0.6 mm.), 117 parts, crystallizes on cooling to room temperature. The following fraction, B.P. 155° to 200° C. (0.6 mm.) also crystallized on cooling to yield two types of crystalline material. The product from cut 1 is recrystallized from a benzene-heptane mixture to give 55 parts of a white solid, M.P. 82° to 84° C.

A second crop of the same product, M.P. 73° to 75° C., is also obtained. The residue is dissolved in hot benzene containing some methanol, then the solution is allowed to cool slowly. The first crop of solid which separates, 24 parts, has a melting point of 213° to 217° C.; a second crop, 34 parts, has a melting point of 194° to 204° C. and separates. Removal of the volatile solvent from the mother liquors gives an additional 40 parts of less pure reaction product.

The product which is obtained from cut 1 has the empirical formula $C_{10}H_{17}O_2N$, which corresponds to the reaction of 1 mole of acetone with 1 mole of 2,2-dimethyl-4-oxopentanonitrile. That the product is 3,3,5-trimethyl-5-(2-oxopropyl)-2-pyrrolidone is confirmed by close inspection of the infrared absorption spectrum.

The 2:1 product, $C_{17}H_{28}O_3N_2$, M.P. 213° to 217° C., is bis-[5-(3,3,5-trimethyl-2-pyrrolidonyl)-methyl]ketone.

*Example 2*

To acetone, 58 parts, is added sodium methoxide (5.4 parts) and 2,2-dimethyl-4-oxopentanenitrile (250 parts). An exothermic reaction occurs and the reaction mixture becomes very viscous. The temperature rises to 100° and is held at 100° C. until the viscosity increases to the point where stirring becomes impossible. Methanol (300 parts by volume) is then added. The mixture refluxes and a precipitate forms while the reaction mixture remains at 92° C. When the addition has been completed, the reaction mixture is stirred for 30 minutes and benzene (300 parts) is added. On cooling, a white precipitate is recovered. The precipitate is washed with benzene and then air dried to give the product, M.P. 194° to 200° C., 143 parts. It is identical to the high melting solid which had been obtained in Example 1. The filtrate is stripped to remove methanol and the second crop, 28 parts, M.P. 190° to 193° C., is collected on cooling. Upon removal of the volatile materials from the mother liquors, 29 parts of less pure product are isolated.

*Example 3*

To a mixture of acetophenone (72 parts) and sodium methoxide (0.8 part) is added 2,2-dimethyl-4-oxopentanenitrile (37.5 parts) with stirring. An exothermic reaction occurs which continues during the entire addition of the ketonitrile. A maximum temperature of 84° C. is reached 38 minutes after the addition begins. The total addition time is 42 minutes. The reaction mixture is stirred for 23 minutes after addition is complete. At this point, the reaction mixture has cooled to 65° C. and the entire reaction mixture solidifies. Methanol (35 parts by volume) is added and the reaction mixture is neutralized with sulfuric acid (1.3 parts). Benzene (100 parts by volume) is added to the neutralized mixture and methanol is removed by distillation. The hot benzene solution is freed of sodium sulfate by filtration. A crystalline product, 43.6 parts, M.P. 142° to 143° C., separates on cooling. On concentration of the mother liquors, a second crop, 3.8 parts, separates. From the mother liquor, additional less pure product is isolated. Crops 1 and 2 represent a yield of 65% of the theoretical amount of the desired product, 5-benzoylmethyl-3,3,5-trimethyl-2-pyrrolidinone. Calculated for $C_{15}H_{19}NO_2$: carbon 73.75% (theoretical 73.44%), hydrogen 7.90% (theoretical 7.81%), and nitrogen 5.76% (theoretical 5.76%). The product has a molecular weight of 255 (theoretical 245).

Substitution of equal weights of potassium t-butoxide, butyl lithium, sodium acetylide, or dimethyl magnesium for the sodium methoxide used in the above example gives the same product in satisfactory yields.

In a similar fashion, p-methylacetophenone and 2,2-dimethyl-4-oxopentanenitrile gives 5-(p-toluoylmethyl)-3,3,5-trimethyl-2-pyrrolidinone, 2-acetylnaphthalene and 2,2-dimethyl-4-oxopentanenitrile gives 5-(2-naphthoylmethyl)-3,3,5-trimethyl-2-pyrrolidinone, and m-methoxyacetophenone and 3-methyl-4-oxopentanenitrile gives 5-(m-anisoylmethyl)-4,5-dimethyl-2-pyrrolidinone.

Example 4

To a stirred mixture of cyclohexanone (60 parts) and sodium methoxide (0.8 part) is added 2,2-dimethyl-4-oxopentanenitrile (37.5 parts). An exothermic reaction ensued which carried the temperature of the reaction mixture from 34° to 68° C. in the course of 30 minutes. Addition is complete after 50 minutes. The reaction mixture is stirred for 10 minutes and then is neutralized with methanolic hydrogen chloride. The reaction mixture is filtered to remove sodium chloride and the filtrate crystallizes on standing. The product, M.P. 155° to 158° C., is shown by elemental analysis and infrared spectrum to be 5-(2-oxocyclohexyl)-3,3,5-trimethyl-2-pyrrolidinone.

In a similar fashion, cyclopentanone and 2,2-dimethyl-4-oxopentanenitrile gives 5-(2-oxocyclopentyl)-3,3,5-trimethyl-2-pyrrolidinone, α-tetralone and 2,2-dimethyl-4-oxopentanenitrile gives (1-oxo-1,2,3,4-tetrahydronaphth-2-yl)-3,3,5-trimethyl-2-pyrrolidinone, and methyl levulinate and 3-methyl-4-oxopentanenitrile give 5-(4-methoxycarbonyl-2-oxobutyl)-4,5-dimethyl-2-pyrrolidinone).

Example 5

To a stirred mixture of methyl ethyl ketone (44 parts) and sodium methoxide (1.1 part) was added 2,2-dimethyl-4-oxopentanenitrile (37.5 parts). Addition was complete in 30 minutes, at which time the temperature had risen from 22° to 83° C. Stirring was continued for an additional 30 minutes, during which time the temperature dropped from 83° to 43° C. Methanolic hydrogen chloride in an amount equivalent to neutralize the catalyst, is added and the reaction mixture was distilled under reduced pressure. The product, 5-(2-oxobutyl)-3,3,5-trimethyl-2-pyrrolidinone, has a boiling point of 142° (0.5 mm.)–159° C. (0.75 mm.), $n_D^{25}$ 1.4700, 26.3 parts.

In a similar fashion, methyl n-hexyl ketone and 2,2-dimethyl-4-oxopentanenitrile gives 5-(2-oxooctyl)-3,3,5-trimethyl-2-pyrrolidinone and methyl-n-dodecyl ketone and 3-methyl-4-oxopentanenitrile gives 5-(2-oxotetradecyl)-4,5-dimethyl-2-pyrrolidinone.

Example 6

To a mixture of methyl isobutyl ketone (60 parts) and sodium methoxide (0.8 part) is added 2,2-dimethyl-4-oxopentanenitrile (37.5 parts) with stirring. An exothermic reaction ensues which carries the temperature from 27° to 77° C. within 18 minutes. Addition is complete after 23 minutes. The reaction mixture is stirred for an additional 35 minutes and is then neutralized with methanolic hydrogen chloride solution. The reaction mixture is distilled under reduced pressure to give a 50% yield of product, boiling point 140° to 142° C. (0.2 mm.). The distillate crystallizes upon standing and is recrystallized from benzene to give the analytical sample, melting point 82° to 82.5° C. Analysis calculated for $C_{13}H_{23}O_2N$: carbon 69.25% (theoretical 69.29%), hydrogen 10.48% (theoretical 10.28%), and nitrogen 5.95% (theoretical 6.21%). The presence of two carbonyl bands at 5.9 and 6.0 microns, respectively, confirms the structure of the reaction product to be 5-(4-methyl-2-oxopentyl)-3,3,5-trimethyl-2-pyrrolidinone.

Example 7

To a stirred mixture of mesityl oxide (59 parts) and sodium methoxide (1.6 parts) is added 2,2-dimethyl-4-oxopentanenitrile (37.5 parts) during 30 minutes. The temperature of the reaction rises from 37° initially to 100° C. by the time 85% of the ketonitrile has been added. At the end of the addition, the temperature is 88° C. On continued stirring for 30 minutes, the temperature drops to 57° C., whereupon the reaction mixture is neutralized with methanolic hydrogen chloride. Distillation under reduced pressure gives the product B.P. 159° to 169° C., which crystallizes on cooling.

Analysis calculated for $C_{13}H_{21}O_2N$: nitrogen 6.40% (theoretical 6.28%). The product has the structure 5-(4-methyl-2-oxo-3-pentenyl)-3,3,5-trimethyl-2-pyrrolidinone.

Example 8

1,3,3-trimethyl-5-oxocyclohexanecarbonitrile (8.3 parts), acetone (40 parts) and sodium methoxide (0.15 part) are combined and stirred. An exothermic reaction occurs which carries the reaction temperature to 48° and maintains that temperature for approximately 10 minutes. The reaction mixture is neutralized with concentrated hydrochloric acid, and the sodium chloride formed is separated by filtration, and excess acetone is removed by stripping under reduced pressure. The residue crystallizes on standing. Upon washing with ether, a white solid product is isolated, melting point 119° to 122° C. Analysis calculated for $C_{13}H_{21}O_2N$: carbon 69.83% (theoretical 69.92%), hydrogen 9.40% (theoretical 9.48%), and nitrogen 6.16% (theoretical 6.27%). The product is 1-(2-oxopropyl)-3,3,5-trimethyl-6-oxo-7-azabicyclo-[3,2,1]octane.

In a similar fashion there is prepared 1-(benzoylmethyl)-3,3,5-trimethyl-6-oxo-7-azabicyclo[3,2,1]octane from acetophenone and 1,3,3-trimethyl-5-oxocyclohexanecarbonitrile, 1-(4-methyl-2-oxopentyl)-3,3,5-trimethyl-6-oxo-7-azabicyclo[3,2,1]octane from methyl isobutyl ketone and 1,3,3-trimethyl-5-oxocyclohexanecarbonitrile, and 1-(4-methoxycarbonyl-3-methyl-2-oxobutyl)-3,3,5-trimethyl-6-oxo-7-azabicyclo[3,2,1]octane from methyl-β-methyllevulinate and 1,3,3-trimethyl-5-oxocyclohexanecarbonitrile.

I claim:
1. A lactam of the formula

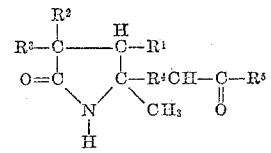
(I)

in which $R^1$, $R^2$ and $R^3$ are
(a) individually selected from the group consisting of a hydrogen atom and a member selected from the class consisting of an alkyl of 1 to 6 carbon atoms and a hydrocarbon group of 5 to 10 carbon atoms selected from the class consisting of cycloalkyl, aralkyl, aryl, and alkaryl,
(b) $R^1$ and $R^2$ when taken together with the carbon atoms to which they are bonded form a saturated carbocyclic group of 5 to 10 carbon atoms, and $R^2$ and $R^3$ when taken together with the carbon atom to which they are bonded form a saturated carbocyclic group of 5 to 10 carbon atoms;

$R^4$ is a hydrogen atom;
$R^5$ is (A) (1) an aliphatic hydrocarbon group selected from the class consisting of alkyl of 1 to 12 carbon atoms and alkenyl of 3 to 8 carbon atoms;
(2) an aromatic hydrocarbon group selected from the class consisting of phenyl, naphthyl, and anthryl;
(3) a —$CH_2R^6$ group wherein $R^6$ is selected from the group consisting of
(a) a hydrogen atom,
(b) a group defined under (A) (1) and (A) (2) and
(c) lactam grouping of the formula

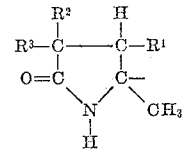

in which the R substituents are defined above;

(B) (1) when $R^4$ and $R^5$ are taken together with the carbon atoms to which they are joined they form a saturated carbocyclic group of 5 to 10 carbon atoms, and (2) a fused grouping of the group defined under (A) (2) fused onto two adjacent carbon atoms of the group defined under (B) (1).

2. A lactam of the formula

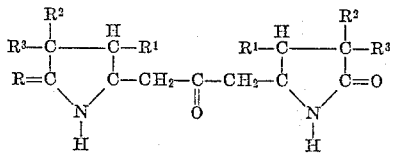

in which $R^1$, $R^2$ and $R^3$ are
(a) individually, an alkyl group of 1 to 6 carbon atoms, and
(b) $R^1$ and $R^2$ when taken together with the carbon atoms to which they are bonded form a saturated carbocyclic group of 5 to 10 carbon atoms, and $R^2$ and $R^3$ when taken together with the carbon atom to which they are bonded form a saturated carbocyclic group of 5 to 10 carbon atoms.

3. A lactam of the formula

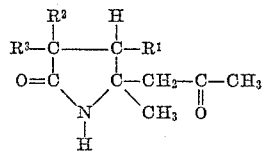

in which $R^1$, $R^2$ and $R^3$ are alkyl groups of 1 to 6 carbon atoms.

4. A lactam of the formula $$CH_2\text{---}CH_2$$
$$O=C\quad C\text{---}CH_2\text{---}C\text{---}CH_3$$
$$\diagdown N \diagup \quad CH_3\quad O$$
$$\underset{H}{|}$$

5. A lactam of the formula $$R^2\quad H$$
$$R^3\text{---}C\text{------}C\text{---}R^1$$
$$O=C\quad C\text{---}CH_2\text{---}C\text{---}R^5$$
$$\diagdown N \diagup \quad CH_3\quad O$$
$$\underset{H}{|}$$

in which $R^1$, $R^2$ and $R^3$ are alkyl groups of 1 to 6 carbon atoms and $R^5$ is an alkyl group of 1 to 12 carbon atoms.

6. 5-(2-oxobutyl)-3,3,5-trimethyl-2-pyrrolidinone.
7. 3,3,5-trimethyl-5-(2-oxopropyl)-2-pyrrolidinone.
8. Bis-[5-(3,3,5-trimethyl-2-pyrrolidonyl)-methyl] ketone.
9. 5-benzoylmethyl-3,3,5-trimethyl-2-pyrrolidinone.
10. 5-(2-oxobutyl)-3,3,5-trimethyl-2-pyrrolidinone.
11. 5-(4-methyl-2-oxo-3-pentenyl)-3,3,5-trimethyl-2-pyrrolidinone.
12. 1-(2-oxopropyl)-3,3,5-trimethyl-6-oxo-7-azabicyclo[3,2,1]octane.

13. A method for the preparation of an adduct of the formula $$R^2\quad H$$
$$R^3\text{---}C\text{------}C\text{---}R^1$$
$$O=C\quad C\text{---}R^4CH\text{---}C\text{---}R^5$$
$$\diagdown N \diagup \quad CH_3\quad O$$
$$\underset{H}{|}$$

which comprises reacting a ketonitrile of the formula $$CH_3\text{---}\underset{\underset{O}{\|}}{C}\text{---}\underset{\underset{CN}{|}}{\overset{\overset{R^1}{|}}{C}H}\text{---}\overset{\overset{R^2}{|}}{C}\text{---}R^3$$

in which $R^1$, $R^2$, and $R^3$ are
(a) individually selected from the group consisting of a hydrogen atom and a compound selected from the class consisting of an alkyl of 1 to 6 carbon atoms and a hydrocarbon group of 5 to 10 carbon atoms selected from the class consisting of cycloalkyl, aralkyl, aryl, and alkaryl,
(b) $R^1$ and $R^2$ when taken together with the carbon atoms to which they are bonded form a saturated carbocyclic group of 5 to 10 carbon atoms, and $R^2$ and $R^3$ when taken together with the carbon atom to which they are bonded form a saturated carbocyclic group of 5 to 10 carbon atoms; and with a ketone of the formula

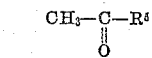

in which $R^5$ is (A)(1) an aliphatic hydrocarbon group selected from the class consisting of alkyl of 1 to 12 carbon atoms and alkenyl of 3 to 8 carbon atoms;
(2) an aromatic hydrocarbon group selected from the class consisting of phenyl, naphthyl, and anthryl;
(3) a —$CH_2R^6$ group wherein $R^6$ is selected from the group consisting of
(a) a hydrogen atom,
(b) a group defined under (A)(1) and (A)(2) and
(c) a lactam grouping of the formula $$R^2\quad H$$
$$R^3\text{---}C\text{------}C\text{---}R^1$$
$$O=C\quad C\text{---}$$
$$\diagdown N \diagup \quad CH_3$$
$$\underset{H}{|}$$

in which the R substituents are defined above;
(B) (1) when $R^4$ and $R^5$ are taken together with the carbon atoms to which they are joined they form a saturated carbocyclic group of 5 to 10 carbon atoms, and
(2) a fused grouping of the group defined under (A) (2) fused onto two adjacent carbon atoms of the group defined under (B) (1),
in the presence of a strong alkaline catalyst at a temperature range of about —50° to 200° C.

14. The process of claim 13 in which the reaction is carried out at a temperature in the range of about 0° to 150° C.

15. The process of claim 13 in which there is employed an excess of ketone over the amount of ketonitrile.

16. The process of claim 13 in which there is employed an excess of ketonitrile over the amount of ketone.

No references cited.